United States Patent [19]  
Nagashima

[11] Patent Number: 4,900,778  
[45] Date of Patent: Feb. 13, 1990

[54] COATING LIQUID COMPOSITION TO FORM HARD COAT FILM ON PLASTICS

[75] Inventor: Toshikazu Nagashima, Yamaguchi, Japan

[73] Assignee: Central Glass Company, Limited, Ube, Japan

[21] Appl. No.: 29,567

[22] Filed: Mar. 24, 1987

[30] Foreign Application Priority Data

Mar. 24, 1986 [JP] Japan ................................. 61-63899

[51] Int. Cl.$^4$ ............................................. C08L 83/06
[52] U.S. Cl. .................................... 524/837; 524/752; 524/767; 524/863
[58] Field of Search ................ 524/837, 752, 767, 863

[56] References Cited

U.S. PATENT DOCUMENTS

| | | | |
|---|---|---|---|
| 4,373,061 | 2/1983 | Ching | 524/837 |
| 4,476,281 | 10/1984 | Vaughn | 524/767 |
| 4,486,503 | 12/1984 | Vaughn | 524/837 |
| 4,500,669 | 2/1985 | Ashlock | 524/837 |
| 4,559,271 | 12/1985 | Doin | 524/837 |

FOREIGN PATENT DOCUMENTS 52-39691 10/1977 Japan.  
2108985 5/1983 United Kingdom.

Primary Examiner—C. Warren Ivy  
Attorney, Agent, or Firm—Fleit, Jacobson, Cohn, Price, Holman & Stern

[57] ABSTRACT

The invention relates to a coating liquid composition useful to form a hard and transparent coating film on plastics. The novel liquid composition comprises a partial polycondensation product of a trialkoxysilane $R^1Si(OR^2)_3$, wherein $R^1$ is a $C_1$ or $C_2$ alkyl group and $R^2$ is a $C_1$–$C_3$ alkyl group, a colloidal silica, water, an aliphatic lower alcohol and anhydride of a polybasic carboxylic acid having a cyclic structure. The content of the acid anhydride must be at least 0.005 wt % when pH of the coating liquid composition is adjusted to 6.0–7.0. The primary merit of using such an acid anhydride is improved storage stability of the coating liquid composition.

6 Claims, No Drawings

COATING LIQUID COMPOSITION TO FORM HARD COAT FILM ON PLASTICS

BACKGROUND OF THE INVENTION

This invention relates to a coating liquid composition which is for forming a hard and wear resistant coating film mainly on plastics articles and which is of the type containing a partial polycondensation product of an organosilanol and colloidal silica Conventional plastics materials in wide use as moldable synthetic resins are generally low in surface hardness and are liable to be damaged by scratching. Therefore, often a protective coating film is formed on plastics articles. Particularly when importance is attached to good transparency of plastics materials as in the cases of polymethyl methacrylate resins and polycarbonate resins used as substitutes for inorganic glass, it is indispensable to protect the plastics surfaces with a hard and transparent coating film.

Several types of hard coating compositions have been developed for application to transparent and other plastics articles by using silicone resin, acrylic resin or melamine resin as the principal component, and at present silicone base hard coating compositions are prevailing mainly because of superiority in surface hardness and weatherability of the obtained coating films. In particular, hard coating compositions containing colloidal silica together with silicone are deemed best in respect of wear resistance of the obtained hard coating films.

As a proposal for improvements on hard coating compositions of the silicone and colloidal silica type, JP 52-39691 shows a coating liquid composition containing a polycondensation product of an organosilanol represented by the general formula $RSi(OH)_3$ (usually R is methyl group), colloidal silica, water and such an amount of acid that the pH of the liquid composition is in the range from 3.0 to 6.0. According to the description the acid controls the degree of condensation of the silanol and shelf life of the liquid composition, and the acid is selected preferably from water miscible carboxylic acids not having a cyclic structure, such as acetic acid, formic acid, propionic acid and maleic acid. However, this coating composition is not sufficient in storage stability and is not convenient for practical preparation because of bad reproducibility which is attributed to insufficient stability of an intermediate liquid composition, and hard coating films formed from this composition are not always satisfactory in some properties and particularly in wear resistance.

SUMMARY OF THE INVENTION

It is an object of the present invention to provide a coating liquid composition of silicone and colloidal silica type, which gives a hard, transparent and wear resistant coating film on plastics articles and which is sufficiently high in storage stability.

According to the invention there is provided a coating liquid composition which is particularly useful to form a hard coating film on plastics articles and which comprises a partial polycondensation product of an organotrialkoxysilane represented by the general formula $R^1Si(OR^2)_3$, wherein $R^1$ is an alkyl group having not more than 2 carbon atoms and $R^2$ is an alkyl group having not more than 3 carbon atoms, a colloidal silica, water, an aliphatic lower alcohol and anhydride of a polybasic carboxylic acid having a cyclic structure, the content of the acid anhydride in the liquid composition being at least 0.005 wt% when pH of the liquid composition is adjusted to 6.0–7.0.

Such a coating liquid composition according to the invention is excellent in storage stability and also in applicability and provides a hard and transparent coating film which is excellent in adhesion, weatherability and wear resistance.

A primary feature of a coating liquid composition according to the invention is containing an aromatic or otherwise cyclic polybasic carboxylic acid in the form of anhydride. The acid anhydride serves as a catalyst for the hydrolyzing polycondensation reaction of the trialkoxysilane. Although the coating liquid composition contains a substantial amount of water, the acid stably remains in the form of anhydride.

In conventional hard coating liquid compositions of the silicone-colloidal silica type the acid catalyst is either an inorganic acid represented by hydrochloric acid or an aliphatic lower carboxylic acid represented by acetic acid. Such an acid catalyst induces rapid hydrolyzing reaction or the silanol. As a consequence, an unstable polymer is formed by partial polycondensation of the silanol. In contrast, the acid catalyst employed in this invention causes the hydrolyzing reaction to gently and slowly proceed with good reproducibility, and a stable polymer is formed by partial polycondensation of the silanol. The reason for such a favorable effect has not fully been elucidated. Presumably, the silanol radicals produced by hydrolysis of the trialkoxysilane and the carboxylic groups of the polybasic acid catalyst make a good interaction (ester precursory bonding) with the effect of regulating the structure of the oligomers formed by partial condensation of the silanol radicals, and as a consequence the acid catalyst makes an important contribution to regulation of the degree of condensation and stabilization of the polycondensation product.

For storage stability of a coating liquid composition according to the invention, it is favorable to maintain the liquid composition in an appreciably acidic state. On the other hand, to shorten the curing time in the coating operation and also to enhance wear resistance and weatherability of the coating film it is suitable to adjust pH of the coating liquid composition to 6.0–7.0 by addition of a weak base.

DESCRIPTION OF THE PREFERRED EMBODIMENTS

In the present invention an organotrialkoxysilane of the above indicated general formula is employed as the starting material of the organosiloxane polymer component of the coating liquid composition. This means using a tri-functional siloxane material in which neither the alkyl group $R^1$ bonding directly to the Si atom nor the alkyl group $R^2$ in the alkoxyl groups is very bulky with a view to forming a relatively dense polymer structure. In the practice of the invention it is preferred to use methyltriethoxysilane as the starting trialkoxysilane. Hydrolyzing partial polycondensation of the trialkoxysilane is accomplished in the course of preparation of the coating liquid composition.

Colloidal silica for use in this invention is available as a commercial material. However, care should be taken to select a weakly basic colloidal silica in the form of aqueous solution which exhibits pH value of 8–9 and of which the stability is enhanced by, for example, introducing $Al^{3+}$ ions. Either an acidic colloidal silica solution containing an inorganic acid as a colloid stabilizing agent or a considerably basic colloidal silica solution containing an inorganic base is not very stable when mixed with an organotrialkoxysilane and is liable to gel and opacify. Therefore, such an acidic or basic colloidal silica cannot be used without pretreatment. The concentration of $SiO_2$ in the aqueous solution of colloidal silica should be adequately controlled in proportion to the quantity of the organotrialkoxysilane. In general it is suitable to use a colloidal silica solution containing 10-40 wt% of $SiO_2$. When the amount of water in this solution is too large or too small, the expected hydrolytic condensation of the trialkoxysilane does not always proceed smoothly and uniformly. The weight ratio of colloidal silica, as $SiO_2$, to the trialkoxysilane is variable over a relatively wide range, which is preferably from 1:10 to 5:10.

The coating liquid composition of the invention contains anhydride of a polybasic carboxylic acid having a cyclic structure, which serves as an acid catalyst for hydrolytic condensation of the organotrialkoxysilane. In preparing this coating liquid composition it is important to mix the organotrialkoxysilane with the acid anhydride. If the acid anhydride is mixed with the trialkoxysilane in the presence of colloidal silica solution it is impossible to obtain a coating liquid composition in which the acid anhydride remains in a desired quantity.

With respect to aromatic polybasic acids, the effects of using an acid anhydride in the coating liquid solution are very remarkable when the acid has two carboxylic groups in ortho-positions with respect to each other. Accordingly it is desirable to use anhydride of phthalic acid, trimellitic acid, pyromellitic acid or benzophenonetetracarboxylic acid. Also it is possible to use anhydride of an alicyclic polybasic carboxylic acid such as tetrahydrophthalic acid, hexahydrophthalic acid, tetrabromophthalic acid, tetrachlorophthalic acid, acid or cyclopentanetetracarboxylic acid. In the process of preparing the coating liquid composition a portion of the acid anhydride is esterified and another portion will become hydrous acid. However, it is necessary that a portion of the acid anhydride should remain in the anhydrous acid form in the obtained coating liquid composition, and the amount of the remaining acid anhydride needs to be at least 0.005 wt% of the coating liquid composition when pH of the liquid composition is adjusted to 6.0-7.0. There is no strict limitation on the maximum amount of the acid anhydride in the coating liquid composition, though in general it is suitable that the content of the acid anhydride is not more than 0.5 wt%.

At the initial step of mixing an organotrialkoxysilane with an acid anhydride and then with colloidal silica, it is suitable to use from 0.05 to 4 parts, and preferably from 0.1 to 2 parts, by weight of acid anhydride per 100 parts by weight of the trialkoxysilane. It is a matter of course that the hydrolysis catalyzing effect of the acid anhydride cannot actually be utilized if the amount of the acid anhydride is too small. However, the effect does not unlimitedly augment even if the amount of the acid anhydride is increased beyond a certain level. By using an adequate amount of acid anhydride as mentioned above, precipitation of ester compounds formed by the subsequent reaction is promoted, and it is possible to obtain a coating liquid composition containing at least 0.005 wt% of acid anhydride.

As to the hydrolytic condensation reaction in the mixture of the organotrialkoxysilane, acid anhydride and aqueous solution of colloidal silica, it is favorable to carry out the reaction at a slightly elevated temperature such as 30-50° C. because at room temperature the rate of reaction is too low. The reaction needs to be continued for a relatively long time with continuous stirring. For example, the reaction is continued for several days when the reaction temperature is about 40° C. The reaction is terminated as the number average molecular weight of the partial polycondensation product reaches about 1000. The molecular weight is calculated based on the pattern of molecular weight distribution found by gel permeation chromatograph (GPC) and a calibration curve prepared by using standard polystyrene.

A liquid composition obtained by the above reaction serves as a sort of coating liquid composition. However, from a practical point of view this composition is not fully satisfactory in its overall characteristics as a coating material mainly because of existence of unwanted soluble salts and esters and inferior evaporation balance of the liquid phase containing uncontrolled amounts of lower alcohols formed as by-products of the reaction. Therefore, an aliphatic lower alcohol having a relatively high boiling point such as isopropyl alcohol or n-propyl alcohol is added to the liquid composition to suitably adjust the evaporation balance of the liquid phase, and then removal of the unwanted solutes and adjustment of the concentration of the solid phase are accomplished by ultrafiltration. In the preparation of conventional coating liquid compositions of the silicone-colloidal silica type it is usual to accomplish the concentration adjustment at this stage by evaporation concentration with a rotary evaporator after addition of an alcohol having a higher boiling point than water, such as isobutyl alcohol or n-butyl alcohol. Such evaporation condensation of the liquid composition results in that the unwanted solutes too are concentrated, so that coating films formed from the concentrated liquid composition are not always satisfactory in some of important characteristics such as transparency, smoothness and/or hardness. When concentrating of the liquid composition is accomplished by ultrafiltration it is possible to remove the unwanted solutes such as carboxylates to such an extent that the content of unwanted solutes in the finally obtained coating liquid composition becomes less than 0.05 wt%. Besides, in the liquid composition concentrated by ultrafiltration the distribution of molecular weight of the partial condensation product becomes very narrow because of a molecular weight delimiting function of the ultrafiltration membrane, and accordingly the liquid composition provides coating films excellent in hardness and other properties. It is suitable to use an ultrafiltration membrane which is 1000 or below in nominal delimitative molecular weight with respect to protein. Such a membrane is available in the market: suitable examples are UH-1 and UH-5 supplied from Toyo Roshi Co. and Pellicon PSAC supplied from Nippon Millipore Ltd.

The ultrafiltration treatment is made so as to obtain a coating liquid composition containing 10-40 wt% of solid component. This coating liquid composition is very excellent in storage stability, but on the other hand curing of this composition requires a relatively long time. Therefore, it is desirable to adequately weaken the acidity of the coating liquid composition to thereby somewhat weaken the protective effect of the acid anhydride on the silanol groups in the partial polycondensation product of trialkoxysilane. This is accomplished by adding a weakly basic compound, which can be regarded as a curing catalyst, to the coating liquid composition. It is unsuitable to use a strong base because of resulting in rapid and local gelation of the liquid composition or loss of stability of the same. Examples of suitable bases are alkali metal salts of carboxylic acids such as sodium acetate, potassium acetate and sodium propionate and weakly basic organic amine compounds such as aniline and hexamethylenetetramine. The amount of addition of a basic compound is controlled such that pH of the treated liquid composition remains in the range from 6.0 to 7.0. If the pH remains below 6.0, coating films formed from the liquid composition may not be sufficient in surface hardness. If the pH becomes above 7.0 the liquid composition almost loses its storage stability. In some cases the addition of the basic compound causes precipitation of some esters and salts and resultant clouding or lowering of transparency of the liquid composition. Therefore, it is desirable to filter the pH adjusted liquid composition with a filter about 0.45 $\mu$m or smaller in pore diameter.

The adjustment of pH by the addition of a base, may be performed precedent to the ultrafiltration treatment described hereinbefore when storage stability of the liquid composition is sufficiently high even after adjusting pH to 6.0-7.0. It is not prohibited to introduce a required amount of acid anhydride into the coating liquid composition after carrying out the condensation reaction, adjustment of the liquid components and the solid phase concentration and the adjustment of pH, but the resultant coating liquid composition is relatively low in stability. It is preferred to add an acid anhydride to the starting material in advance of the condensation reaction.

A coating liquid composition obtained by the above described process is applicable to plastics materials largely used as substitutes for inorganic glass such as polymethyl methacrylate (PMMA) and polycarbonate (PC) to form a hard and transparent coating film. In the cases of plastics materials not good in adhesion of the coating material thereto, such as PC, it is desirable to first apply a commercially available acrylic resin base primer to the plastics materials. This coating liquid composition is applicable to any material insofar as good adhesion of the coating film is ensured and insofar as heat resistance of the material is higher than 80° C. which is the lower boundary of practical curing temperatures for this coating composition. The coating liquid composition can easily be applied to an object of coating by a conventional method such as dipping, spraying, flow coating or spin coating. Usually the coating operation is performed so as to form a liquid coating film having a thickness of 1 to 20 $\mu$m, and preferably 3 to 10 $\mu$m, and the coating film is left to air drying with care not to induce dew condensation on the coating film surface, which will result in clouding of the coating film upon evaporation of the solvent. After that the coating film is cured at 70-150° C., and preferably at 80-130° C., for about 30 minutes to a few days.

For further improvement in applicability of a coating liquid composition of the invention and/or in weatherability of the coating films, a conventional silicone base flow improving agent and/or a conventional benzophenone base UV absorber can be added to the liquid composition without any adverse effect. Also it is optional to add an antistatic agent and/or an antihaze agent to the coating liquid composition though the surface hardness of the coating films is sacrificed to some extent by the addition of such agents.

EXAMPLE 1

First, a mixture of 225 parts by weight of methyltriethoxysilane and 0.4 part by weight of phthalic anhydride was heated at 40° C. for 3 hr, and then 275 parts by weight of a weakly basic aqueous solution of colloidal silica ($SiO_2$ content 20 wt%, average particle size of colloidal silica 15 $\mu$m) was added. The resultant mixture was kept heated at 40° C. for 3 days with continuous stirring to carry out hydrolytic partial polycondensation reaction of methyltriethoxysilane. In the resultant liquid composition the content of solid phase was 28 wt%, and number average molecular weight of the partial polycondensation product was measured to be about 1200 by GPC. Then 360 parts by weight of isopropyl alcohol was added to the liquid composition. After that the liquid composition was concentrated to about a half volume by treatment with an ultrafilter using an ultrafiltration membrane (UH-1 of Toyo Roshi Co.) which was 1000 in nominal delimitative molecular weight to thereby obtain a coating liquid composition 1-A which contained 27 wt% of solid phase and in which number average molecular weight of the partial polycondensation product was about 1200.

To 100 parts by weight of the liquid composition 1-A, 0.2 part by weight of $CH_3COONa.3H_2O$ was added to adjust pH of the composition to about 6.2. After that the liquid composition was stirred for about 12 hr and was filtered to remove precipitated reaction products to thereby obtain a coating liquid composition 1-B which contained 27 wt% of solid phase and in which number average molecular weight of the partial polycondensation product was about 1600. In this liquid composition 1-B the content of phthalic anhydride was measured to be 0.011 wt% by high speed liquid chromatography (using a UV detector) performed by an internal standard method.

To examine storage stability, samples of the liquid compositions 1-A and 1-B were left standing at room temperature until gelation took place. Separately, each of these compositions 1-A and 1-B was applied by a dip coating method to a PC plate, which was coated with an acrylic resin base primer and dried in advance, at 25° C. and at 45% relative humidity. After air drying the coating film was cured to a hard coating film by heating at 120° C. for 1 hr in one case and for 24 hr in another case. For the two kinds of hard coating films formed from the liquid compositions 1-A and 1-B, respectively, wear resistance, adhesion and weather resistance were measured by the test methods described below. The results are shown in Table 1.

Besides, the liquid composition 1-B was applied by a dip coating method to a PMMA plate, which was coated with an acrylic resin base primer and dried in advance, at 25° C. and at 45% relative humidity. After air drying the coating film was cured to a hard coating film by heating at 90° C. for 3 hr. The aforementioned tests were made on this coating film too.

Wear resistance was measured by a method generally in accordance with ASTM D 1044 using Taber's abrasion resistance tester. The abrading wheels were of CS-10F type, and the load on each wheel was 500 g. Wear resistance was represented by the amount of a change in haze value produced by 500 turns of the abrading wheels.

Adhesion was evaluated by a cross-cut peel test generally in accordance with JIS K 5400. The test result in Table 1 indicates the proportion of no-peel areas to the tested 100 areas.

Weather resistance was examined with a sunshine weathermeter according to JIS D 0205 to measure the length of time elapsed before perception of a change in appearance of the coating film by visual observation.

EXAMPLE 2

In accordance with Example 1, partial polycondensation reaction of methyltriethoxysilane was carried out for 3 days in the presence of colloidal silica and phthalic anhydride. In this example 0.3 part by weight of $CH_3COONa.3H_2O$ was added to the liquid composition immediately after the 3-day reaction to adjust pH of the composition to about 6.3. After that the liquid composition was stirred for several hours and was filtered to remove precipitated reaction products. Next, the liquid composition was diluted with 360 parts by weight of isopropyl alcohol, and the ultrafiltration treatment described in Example 1 was made in the same manner to thereby obtain a coating liquid composition 2-B. In this liquid composition 2-B the content of phthalic anhydride was 0.009 wt%. Storage stability of this composition 2-B was examined in the same manner as in Example 1, and the aforementioned tests were made on the hard coating films formed from this liquid composition on the PC plate mentioned in Example 1. The results are contained in Table 1.

TABLE 1

| Coating Liquid Composition | Substrate (curing condition) | Wear | Adhesion | Weather Resistance (hr) | Storage Stability of Composition (month) |
|---|---|---|---|---|---|
| 1-A (Ex. 1) | PC plate (120° C., 1 hr) | 33 | 100/100 | >500 | >6 |
| | PC plate (120° C., 24 hr) | 6 | 100/100 | >1000 | |
| 1-B (Ex. 1) | PC plate (120° C., 1 hr) | 0.8 | 100/100 | >1000 | >3 |
| | PMMA plate (90° C., 3 hr) | 3.0 | 100/100 | >1000 | |
| 2-B (Ex. 2) | PC plate (120° C., 1 hr) | 0.9 | 100/100 | >1000 | >3 |

EXAMPLES 3-10

In these examples, Example 1 was variously modified as shown in Tables 2-A and 2-B by using methyltrimethoxysilane (MTMS) in place of methyltriethoxysilane (MTES), by using pyromellitic acid anhydride (PYR-AH) or trimellitic acid anhydride (TRI-AH) in place of phthalic anhydride (PHT-AH), by varying the amount of colloidal silica, by varying the amount of sodium acetate trihydrate (Na-ACE) or using a different base such as hexamethylenetetramine (HMT), potassium acetate (K-ACE), sodium propionate (Na-PRP) or aniline and/or by varying the amount of isopropyl alcohol (IPA) or using n-propyl alcohol (NPA). Except such changes in materials, the coating liquid preparation process of Example 1 was repeated. In the Tables, the suffix "A" of the code names of liquid compositions refers to coating liquid composition after ultrafiltration treatment and before addition of a base, and the suffix "B" refers to coating liquid composition after adjustment of pH with a base.

COMPARATIVE EXAMPLE 1

The partial polycondensation reaction of Example 1 was repeated by using 10 ml of 1 N HCl in place of 0.4 part by weight of phthalic anhydride. As the reaction was carried out for 1 day gelation of the reaction liquid took place. Therefore, it was impossible to obtain a practically applicable coating liquid composition.

COMPARATIVE EXAMPLES 2 AND 3

The process of Example 1 was repeated except that acetic acid (ACE) and maleic anhydride (MAL-AH) were used in Comparative Examples 2 and 3, respectively, in place of phthalic anhydride in Example 1. The particulars of the obtained coating liquid compositions C2-A, C2-B, C3-A, C3-B are shown in Tables 2-A and 2-B.

COMPARATIVE EXAMPLE 4

Partial polycondensation of methyltriethoxysilane was carried out generally in accordance with Example 1 but by using maleic anhydride in place of phthalic anhydride. The resultant liquid composition was diluted with 360 parts by weight of isobutyl alcohol and then was concentrated to about a half volume at 50° C. under reduced pressure of 10 mmHg in a rotary evaporator to thereby obtain a coating liquid composition C4 A. Subsequently this composition was modified into another coating liquid composition C4-B by addition of sodium acetate trihydrate. The particulars of C4-A and C4-B are shown in the Tables.

COMPARATIVE EXAMPLE 5

The process of Example 1 was modified only in that methyltriethoxysilane, phthalic anhydride and the aqueous solution of colloidal silica were simultaneously mixed together at the start of the reaction. The particulars of the obtained coating liquid compositions are shown in the Tables.

COMPARATIVE EXAMPLE 6

The process of Example 1 was repeated except that ortho-phthalic acid (OPH) was used in place of phthalic anhydride. The particulars of the obtained coating liquid compositions are shown in the Tables.

The coating liquid compositions prepared in Examples 3-10 and Comparative Examples 2-6 were subjected to testing of storage stability in the same manner as in Example 1. These liquid compositions were each applied to the PC plate mentioned in Example 1 to form hard coating films in substantially the same way as in Example 1. The curing time was 1 hr. The tests described in Example 1 were made on the hard coating films of Examples 3-10 and Comparative Examples 2-6. The test results are shown in Table 3.

TABLE 2-A

| | Alkoxy-silane (part by wt.) | Acid (part by wt.) | Colloidal Silica (part by wt.) | Liquid Composition as reacted Average MW | Liquid Composition as reacted Solid Phase (wt %) | Coating Liquid Composition X-A Average MW | Coating Liquid Composition X-A Solid Phase (wt %) |
|---|---|---|---|---|---|---|---|
| Ex. 3 3-A | MTES (225) | PYR—AH (0.4) | SiO$_2$ 20% (275) | 1200 | 27 | 130 | 26 |
| Ex. 4 4-A | MTES (225) | TRI—AH (0.4) | SiO$_2$ 20% (275) | 1200 | 28 | 1300 | 27 |
| Ex. 5 5-A | MTMS (225) | PHT—AH (0.4) | SiO$_2$ 20% (275) | 1300 | 32 | 1400 | 31 |
| Ex. 6 6-A | MTES (225) | PHT—AH (0.4) | SiO$_2$ 40% (275) | 1200 | 39 | 1200 | 38 |
| Ex. 7 7-A | MTES (225) | PHT—AH (0.4) | SiO$_2$ 20% (275) | 1200 | 28 | 1200 | 27 |
| Ex. 8 8-A | MTES (225) | PHT—AH (0.4) | SiO$_2$ 20% (275) | 1200 | 28 | 1200 | 27 |
| Ex. 9 9-A | MTES (225) | PHT—AH (0.4) | SiO$_2$ 20% (275) | 1200 | 28 | 1200 | 27 |
| Ex. 10 10-A | MTES (225) | PHT—AH (0.4) | SiO$_2$ 20% (275) | 1200 | 28 | 1200 | 27 |
| Comp. Ex. 2 C2-A | MTES (225) | ACE (0.4) | SiO$_2$ 20% (275) | 1200 | 28 | 1300 | 27 |
| Comp. Ex. 3 C3-A | MTES (225) | MAL—AH (0.4) | SiO$_2$ 20% (275) | 1200 | 27 | 1300 | 27 |
| Comp. Ex. 4 C4-A | MTES (225) | MAL—AH (0.4) | SiO$_2$ 20% (275) | 1200 | 27 | 1300 | 28 |
| Comp. Ex. 5 C5-A | MTES (225) | PHT—AH (0.4) | SiO$_2$ 20% (275) | 1200 | 27 | 1300 | 27 |
| Comp. Ex. 6 C6-A | MTES (225) | OPH (0.4) | SiO$_2$ 20% (275) | 1200 | 27 | 1300 | 27 |

TABLE 2-B

| | Added Base (part by wt %) | pH | Coating Liquid Composition X-B Average MW | Coating Liquid Composition X-B Solid Phase (wt %) | Contents of Acid Anhydride (wt %) | Added Solvent (part by wt.) |
|---|---|---|---|---|---|---|
| Ex. 3 3-B | Na—ACE (0.15) | 6.2 | 1800 | 26 | 0.006 | IPA (360) |
| Ex. 4 4-B | Na—ACE (0.15) | 6.3 | 1700 | 27 | 0.008 | IPA (360) |
| Ex. 5 5-B | Na—ACE (0.15) | 6.3 | 1900 | 30 | 0.01 | NPA (340) |
| Ex. 6 6-B | Na—ACE (0.15) | 6.2 | 1700 | 38 | 0.011 | IPA (305) |
| Ex. 7 7-B | HMT (0.4) | 6.2 | 1600 | 27 | 0.015 | IPA (360) |
| Ex. 8 8-B | K—ACE (0.15) | 6.2 | 1600 | 27 | 0.009 | IPA (360) |
| Ex. 9 9-B | Na—PRP (0.15) | 6.2 | 1600 | 27 | 0.01 | IPA (360) |
| Ex. 10 10-B | aniline (0.3) | 6.2 | 1600 | 27 | 0.013 | IPA (360) |
| Comp. Ex. 2 C2-B | Na—ACE (0.3) | 6.3 | 2000 | 27 | 0 | IPA (360) |
| Comp. Ex. 3 C3-B | Na—ACE (0.15) | 6.3 | 1900 | 27 | 0 | IPA (360) |
| Comp. Ex. 4 C4-B | Na—ACE (0.15) | 6.3 | 1600 | 28 | 0 | IBA (360) |
| Comp. Ex. 5 C5-B | Na—ACE (0.15) | 6.3 | 1600 | 27 | <0.001 | IPA (360) |
| Comp. Ex. 6 C6-B | Na—ACE (0.15) | 6.3 | 1600 | 27 | 0 | IPA (360) |

TABLE 3

| | Coating Liquid Composition | Wear | Adhesion | Weather Resistance (hr) | Storage Stability of Composition (month) |
|---|---|---|---|---|---|
| Ex. 3 | 3-A | 37 | 100/100 | >500 | >6 |
| | 3-B | 1.3 | " | >1000 | >3 |
| Ex. 4 | 4-A | 38 | " | >500 | >6 |
| | 4-B | 1.2 | " | >1000 | >3 |
| Ex. 5 | 5-A | 35 | " | >500 | >6 |
| | 5-B | 0.9 | " | >1000 | >3 |

TABLE 3-continued

| | Coating Liquid Composition | Wear | Adhesion | Weather Resistance (hr) | Storage Stability of Composition (month) |
|---|---|---|---|---|---|
| Ex. 6 | 6-A | 35 | " | >500 | >6 |
| | 6-B | 1 | " | >1000 | >3 |
| Ex. 7 | 7-A | 40 | " | >500 | >6 |
| | 7-B | 1.5 | " | >1000 | >3 |
| Ex. 8 | 8-A | 33 | " | >500 | >6 |
| | 8-B | 1 | " | >1000 | >3 |
| Ex. 9 | 9-A | 33 | " | >500 | >6 |
| | 9-B | 1.5 | " | >1000 | >3 |
| Ex. 10 | 10-A | 40 | " | >500 | >6 |
| | 10-B | 1.5 | " | >1000 | >3 |
| Comp. Ex. 2 | 2C-A | 4 | " | >500 | >3 |
| | 2C-B | 3 | " | >1000 | >1 |
| Comp. Ex. 3 | 3C-A | 30 | " | >500 | >4 |
| | 3C-B | 2.5 | " | >1000 | >2 |
| Comp. Ex. 4 | 4C-A | 35 | " | >500 | >4 |
| | 4C-B | 5 | " | >1000 | >2 |
| Comp. Ex. 5 | 5C-A | 40 | " | >500 | >5 |
| | 5C-B | 2.5 | " | >1000 | >2 |
| Comp. Ex. 6 | 6C-A | 40 | " | >500 | >6 |
| | 6C-B | 3 | " | >1000 | >3 |

What is claimed is:

1. A coating liquid composition particularly useful to form a hard coating film on plastics articles, comprising:
   an aqueous colloidal silica solution;
   a partial polycondensate of an organotrialkoxysilane represented by the formula $R^1Si(OR^2)_3$, wherein $R^1$ is an alkyl group having not more than 2 carbon atoms and $R^2$ is an alkyl group having more than 3 carbon atoms, said partial polycondensate having a number average molecular weight of from about 1000 to about 2000 and said partial polycondensate of the organotrialkoxysilane being formed by mixing said organotrialkoxysilane with an anhydride of a polybasic cyclic carboxylic acid and then mixing the resultant mixture with said aqueous colloidal silica solution having a pH of from about 8 to 9 to cause hydrolytic condensation of said organotrialkoxysilane; and
   a lower alkyl alcohol selected from the group consisting of isopropyl alcohol and n-propyl alcohol;
   wherein, the weight ratio of the colloidal silica in said aqueous colloidal silica solution, as $SiO_2$, to the organotrialkoxysilane is from 1:10 to 5:10;
   wherein the content of the acid anhydride remaining in the liquid composition is at least 0.005% by weight when the pH of the liquid composition is adjusted to 6.0 to 7.0; and
   wherein the organotrialkoxysilane of the formula $R^1Si(OR^2)_3$ is the sole alkoxysilane used in the liquid coating composition.

2. A coating liquid composition according to claim 1, wherein said polybasic carboxylic acid is selected from the group consisting of phthalic acid, pyromellitic acid, trimellitic acid and benzophenonetetracarboxylic acid.

3. A coating liquid composition according to claim 1, wherein said polybasic carboxylic acid is selected from the group consisting of tetrahydrophthalic acid, and cyclopentanetetracarboxylic acid.

4. A coating liquid composition according to claim 1, wherein the content of the acid anhydride in the liquid composition is not more than 0.5%.

5. A coating liquid composition according to claim 1, wherein said organotrialkoxysilane is methyltriethoxysilane.

6. A coating liquid composition according to claim 1, wherein said organotrialkoxysilane is methyl trimethoxysilane.

* * * * *